(12) United States Patent
Rapanakis et al.

(10) Patent No.: US 9,775,364 B2
(45) Date of Patent: Oct. 3, 2017

(54) METHOD FOR MANUFACTURING A POWDER OF SERUM EXTRACTED FROM GREEK STYLE YOGURT

(71) Applicant: Hellenic Protein SA, Athens (GR)

(72) Inventors: Panteleimon Rapanakis, Athens (GR); Konstantinos Tsakmakidis, Athens (GR)

(73) Assignee: Hellenic Protein SA, Athens (GR)

( * ) Notice: Subject to any disclaimer, the term of this patent is extended or adjusted under 35 U.S.C. 154(b) by 323 days.

(21) Appl. No.: 14/084,928

(22) Filed: Nov. 20, 2013

(65) Prior Publication Data
US 2015/0030746 A1 Jan. 29, 2015

(30) Foreign Application Priority Data
Jul. 26, 2013 (GR) .................. 130100441

(51) Int. Cl.
*A23C 1/16* (2006.01)
*A23C 21/06* (2006.01)

(52) U.S. Cl.
CPC ............. *A23C 1/16* (2013.01); *A23C 21/06* (2013.01)

(58) Field of Classification Search
CPC ........... A23C 1/16; A23C 21/06; A23C 21/00; A23C 1/04
USPC ....................................... 426/583
See application file for complete search history.

(56) References Cited

U.S. PATENT DOCUMENTS

| | | | | |
|---|---|---|---|---|
| 2,661,294 A | * | 12/1953 | Meade | A23C 1/04 127/31 |
| 3,615,663 A | * | 10/1971 | Becker | A23C 21/00 159/48.1 |
| 4,070,766 A | * | 1/1978 | Kamphuis | B01D 1/18 34/380 |
| 4,349,542 A | * | 9/1982 | Staniforth | A61K 9/20 127/29 |
| 4,871,573 A | * | 10/1989 | Bohren | A23C 1/04 426/585 |
| 4,955,363 A | * | 9/1990 | Harju | C13K 5/00 127/31 |
| 5,580,592 A | * | 12/1996 | Nassauer | A23C 21/10 159/48.1 |

(Continued)

FOREIGN PATENT DOCUMENTS

| | | |
|---|---|---|
| EP | 0821881 | 9/2001 |
| EP | 2027777 | 2/2009 |

OTHER PUBLICATIONS

"Maximum Free Passage SK Series SprayDry Nozzles," Spraying Systems Co., available as of Mar. 24, 2006 at http://web.archive.org/web/20060324090002/http://service.spray.com/lit/view_lit.asp?code=B527.*

*Primary Examiner* — Jeffrey Mornhinweg
(74) *Attorney, Agent, or Firm* — Kaplan Breyer Schwarz, LLP

(57) ABSTRACT

A method of making a powder of serum extracted from a Greek style yogurt is disclosed. The total solids concentration of the serum is increased to at least 35% by weight to produce a concentrated serum. The concentrated serum is crystallized by adding lactose crystals whose average size is less than 100 microns. The crystallized serum is then spray dried to produce a serum powder. The resulting powder is non-hygroscopic, less likely to form lumps in storage, retains the initial characteristics of the serum and is of sufficiently high quality to be fit for human consumption.

17 Claims, 1 Drawing Sheet

(56) References Cited

U.S. PATENT DOCUMENTS

| | | | |
|---|---|---|---|
| 6,790,288 B2* | 9/2004 | Henningfield | A23C 21/00 127/16 |
| 7,241,465 B2* | 7/2007 | Keller | C13K 5/00 127/58 |
| 2004/0132989 A1* | 7/2004 | Lifran | A23L 2/52 536/123.13 |
| 2008/0230051 A1* | 9/2008 | Bonke | A23C 1/04 127/61 |
| 2009/0291146 A1* | 11/2009 | Roche | A61K 31/353 424/499 |
| 2014/0322170 A1* | 10/2014 | Christiansen | A61K 35/741 424/93.4 |
| 2015/0056358 A1* | 2/2015 | Keller | A23C 1/12 426/583 |

* cited by examiner

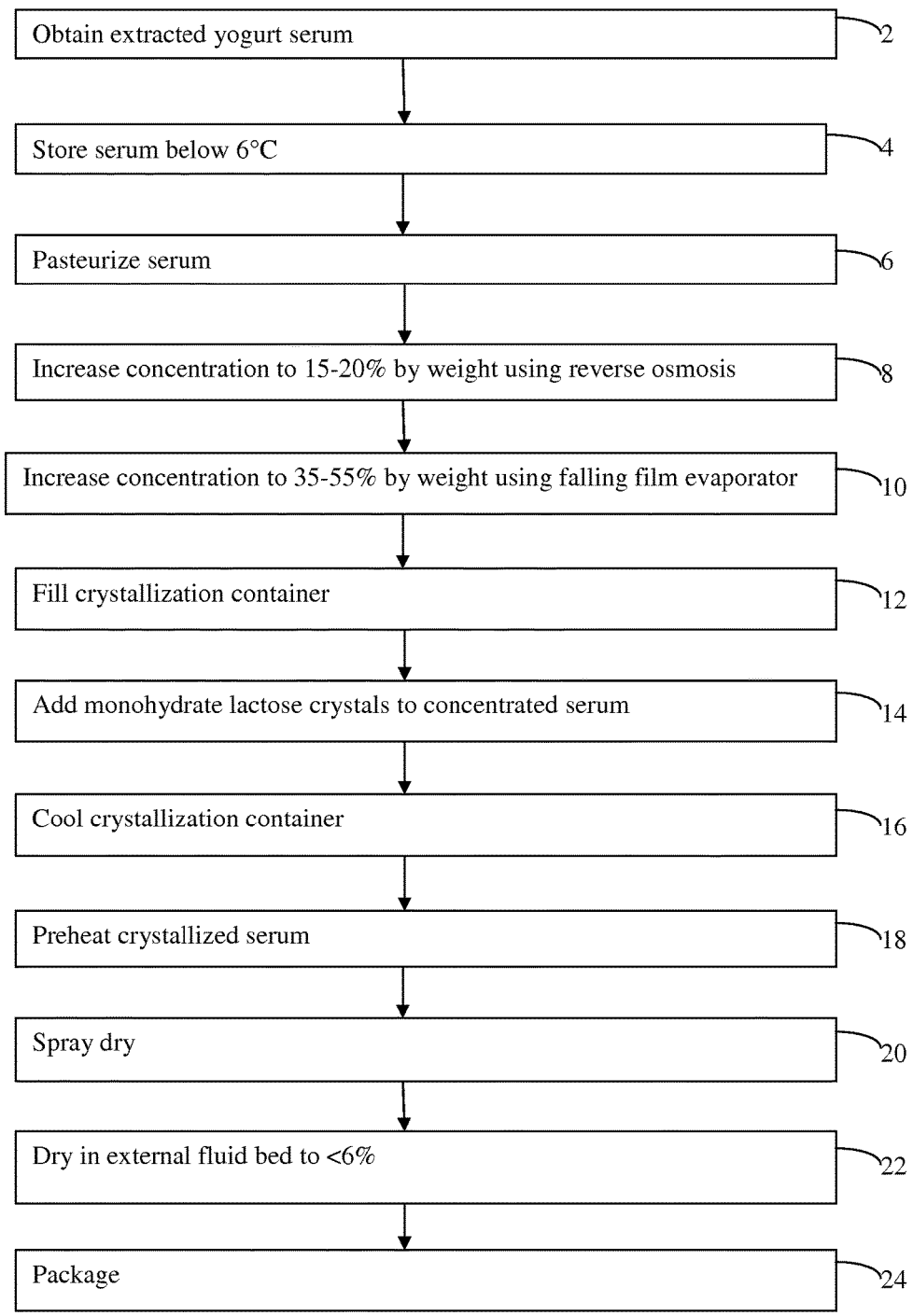

METHOD FOR MANUFACTURING A POWDER OF SERUM EXTRACTED FROM GREEK STYLE YOGURT

CROSS-REFERENCE TO RELATED APPLICATIONS

This application claims priority under 35 U.S.C. 119 to Greek Patent Application No. 20130100441, filed Jul. 26, 2013, which is incorporated by reference.

TECHNICAL FIELD

The present invention is related to food processing, and in particular, a method of manufacturing a powder from a serum extracted from a Greek style yogurt.

BACKGROUND OF THE INVENTION

A Greek yogurt or Greek style yogurt is a type of yogurt in which serum from the yogurt has been extracted. The Greek style yogurt is high in protein, and has a tangier, less sweet as well as creamier taste than a regular yogurt. For these reasons, it has become increasingly popular and is now a $2 billion a year industry.

Production of the Greek style yogurt, however, produces a large quantity of the serum as a waste product. For example, it takes about four pounds of milk to make one pound of the yogurt. The other three pounds are extracted out of the yogurt as thin acidic serum.

A typical composition of the serum extracted from the Greek style yogurt includes total solids by weight of about 5.1% to about 5.4%: primarily lactose (3.95% to 4.20%), protein (0.25% to 0.28%), fat (0%), lactic acid (0.32% to 0.35%) and ash (0.60% to 0.65%). Due to the serum having fewer solids and being more acidic than other milk serums, the serum from the Greek style yogurt is difficult to process, especially in crystallizing and drying the serum. Moreover, the perishable nature of the serum and the lack of research and investigation in its processing methods have resulted in a negligible utilization of the serum and the inability of entering the food chain.

In the past, the yogurt makers gave away the serum as a feed additive to local farmers and even paid them to take it. However, due to the exploding popularity of the Greek style yogurt, the amount of serum being produced as a by-product has overgrown the capacity of the farmers to use it. Moreover, the serum cannot be simply thrown away as it would rob oxygen from streams and rivers, destroying aquatic life over potentially large areas.

Not surprisingly, in Greece, the utilization of the yogurt serum derived from the Greek style yogurt production has become a highly important environmental issue. For that reason, the processing of the Greek style strained yogurt serum became last year's subject of research and investigation to look for better ways to use the by-product.

However, past attempts to process the serum derived from the Greek style yogurt into a powder form have only resulted in the production of hygroscopic powder with high degree of caking. Additionally, that powder was discolored and was characterized by salty flavor with the absence of the typical yogurt flavor.

Therefore, it would be desirable to provide a system and method for manufacturing a powder from the Greek style strained yogurt serum which is non-hygroscopic, less likely to form lumps in storage, which retains the initial characteristics of the serum including high nutritional value and the typical flavor of the Greek style strained yogurt, and which is of sufficiently high quality to be fit for human consumption.

SUMMARY OF THE DISCLOSURE

According to the present invention, a method of making a powder of serum extracted from a Greek style yogurt is provided. The total solids concentration of the serum is increased to at least 35% by weight to produce a concentrated serum. The concentrated serum is crystallized by adding lactose crystals whose average size is less than 100 microns. The crystallized serum is then spray dried to produce a serum powder.

According to another aspect of the invention, a powder of serum extracted from a Greek style yogurt is provided. The serum powder comprises a moisture content of at most 6% by weight and lactic acid of at least 4.5% by weight, wherein the powder has an acidity level of at least 0.35%.

Advantageously, the resulting powder is non-hygroscopic, less likely to form lumps in storage, retains the initial characteristics of the serum and is of sufficiently high quality to be fit for human consumption.

BRIEF DESCRIPTION OF THE DRAWING

The FIGURE is a flow chart of a method of making a powder of serum extracted from a Greek style yogurt according to one embodiment of the present invention.

DETAILED DESCRIPTION OF THE INVENTION

For purposes of this application, the word "straining" means extracting which includes filtering, gravity filtering and mechanical filtering such as centrifuge.

The FIGURE illustrates a method of making a powder of serum extracted from a Greek style yogurt according to one embodiment of the present invention.

In step 2, yogurt serum is extracted as a by-product from the production of Greek style yogurt. In one embodiment, the serum is obtained using a centrifuge. In step 4, the extracted serum is stored in a storage container at 6° C. or below, preferably between 2° C. and 6° C.

In step 6, the extracted serum is pasteurized to destroy certain microorganisms and to prevent spoilage. If the serum will be processed immediately after extraction, then the pasteurizing step may be skipped.

Next, the serum is concentrated by increasing the total solids concentration by weight from about 5% to at least 35%, preferably between 35% and 55% and most preferably between 40% and 50%. This can be done in one step, for example, by using a very large falling film evaporator while the serum is exposed to a temperature of between 40° C. and 70° C. In the embodiment shown in the FIGURE, this is done in two steps (steps 8 and 10). In step 8, reverse osmosis is performed on the extracted serum until the total solids concentration by weight is increased to about 15%-20%. In step 10, a subsequent concentration is carried out in a multiple stage falling film evaporator having an integrated flash cooler. The technology of the falling film evaporator ensures that the product is not overheated. In one embodiment, the falling film evaporator has three stages where the serum is exposed to a temperature of between 40° C. and 70° C. In one particular embodiment, temperature range in the three stages is, respectively, 64° C.-68° C. (first stage), 56° C.-60° C. (second stage) and 48° C.-52° C. (third stage).

Maximum temperature in the falling film evaporator should not exceed 70° C. at any stage. The thin product layer on the surface of the evaporator enables fast water evaporation, thereby protecting the heat sensitive ingredients in the serum. The final total solids content by weight of the concentrated serum should be about between 35% and 55%. After passing through the falling film evaporator, the serum is deposited into the integrated flash cooler which cools the serum to about 40° C. to 50° C.

In step 12, the concentrated serum is collected in a cooling crystallization container. The filling of the serum takes about 2 to 2.5 hours during which the temperature of the container is kept at the relatively hot temperature of 35° C. to 45° C., preferably 38° C. to 42° C., to prevent pre-crystallization of the lactose in the concentrated serum.

When the cooling crystallization container is about 20%-40% full, the container is cooled rapidly to bring the temperature of the serum down to 28° C. to 32° C. as quickly as possible while at the same time the serum is constantly agitated. In one embodiment, the cooling to 28° C. to 32° C. occurs within 120 minutes, preferably within 100 minutes or less, and the cooling rate is at least 4° C./hr.

Once the temperature of the concentrated serum inside the cooling crystallization container reaches 28° C. to 32° C., monohydrate lactose crystals are added to start the crystallization process of the lactose in the serum (step 14). At least 0.5 kg/ton of the lactose crystals should be added in step 14 for an effective crystallization of the lactose. The average size of the lactose crystals is preferably 100 microns or less, more preferably at most 80 microns, and most preferably at most 50 microns. Typically, in a package of lactose crystals whose average crystal size is less than 100 microns, 90% of the crystals are at 100 microns or less and 98% of the crystals are at 140 microns (40% longer than the specified size of 100 microns) or less. Similarly, when 80 microns is specified, 90% of the crystals are at 80 microns or less, and when 50 microns is specified, 90% of the crystals are at 50 microns or less.

In step 16, once the lactose crystals have been added, the concentrated serum in the cooling crystallization container is gradually lowered from 28° C. to 32° C. to between 10° C. and 16° C. while the serum is under constant agitation. In particular, the concentrated serum is cooled at the rate of 1.5° C./hr to 2.5° C./hr (more preferably at about 2° C./hour) until the cooling limit of about 24° C. to 26° C. is reached, then at the rate of 1.0° C./hr to 1.4° C./hr (more preferably at about 1.2° C./hour) until the cooling limit of about 15° C. to 17° C. is reached. Finally, the serum is further cooled at the rate of 0.8° C./hr to 1.2° C./hr (more preferably at about 1° C./hour) until the cooling limit of about 10° C. to 16° C. is reached or until the lactose crystallization reaches a predetermined rate of at least about 60% (more preferably at least about 70%).

These temperature levels ensure a uniform distribution and the desired size of crystals in the product. At the end of the crystallization procedure (i.e., at the end of step 16), the degree of crystallization should be great than or equal to about 60% and the average size of lactose crystals is less than 15 microns. Preferably, the degree of crystallization is about 70% or more and the average size of lactose crystals is less than 12 microns. The cooling step (step 16) should take at least 5 hours, preferably at least 8 hours and most preferably between 8 hours and 16 hours for an effective crystallization of the lactose.

The high degree of crystallization and the size of the product crystals are decisive factors for the subsequent drying procedure. The structure of the lactose crystals enables the diffusion of water in the surface of the droplet during the spray drying step, enabling the drying of the droplet.

After the end of step 16, the concentrated serum containing crystallized lactose crystals is still in semi-liquid form, which is about 40-50% solid and 50-60% water. The serum is then dried in steps 20 and 22. Prior to drying, however, the serum is preheated to about 14° C. to 20° C. under constant agitation in step 18 in order to improve the rheological properties so that the serum more easily passes through the nozzles in subsequent drying steps.

In step 20, the concentrated serum is spray dried using high pressure nozzles to the chamber of a two stage spray dryer with an external vibrating fluid bed. In one embodiment, Anhydro Triple-A® Dryer from SPX Flow Technology Danmark A/S of Denmark can be used.

The crystallized serum is sprayed through the nozzles with a pressure of more than 170 bar, preferably more than 200 bar while the temperature of the main inlet air is kept at 155° C. to 165° C. The high pressure nozzles have small orifices of 0.99-1.09 mm. The temperature of the outlet air is 85° C.-89° C. In the integrated fluid bed of the dryer the temperature is maintained at 65° C.-70° C. The powder leaves the drying chamber with a moisture content of 8-10% by weight.

In step 22, the serum powder is further dried on the two stage vibrating fluid bed to reach a final moisture content of less than 6% by weight, preferably less than 4% by weight. In stage one of the vibrating bed, the residual moisture is removed by a hot air stream having a temperature of 40° C.-50° C. In stage two (cooling stage) of the external vibrating fluid bed, the drying powder is exposed to a cooling air stream having a temperature of between 15° C.-20° C. A free flowing agent is injected at the outlet of the external vibrating fluid bed, at a percentage of maximum 1% by weight of the final product.

In step 24, the final powder product is packaged by bagging under the temperature range of between 20° C. and 25° C.

The following examples further illustrate the present invention.

Example 1

Greek style strained yogurt serum with 5.1% by weight of total solids was concentrated with reverse osmosis to a percentage of 15% by weight of total solids. The serum was subsequently concentrated through a three stage falling film evaporator to a total solids content of 50% by weight. The concentrated yogurt serum exiting the flash cooler of the evaporator had a temperature of 47° C. and was pumped to a 15 m³ crystallization tank. The cooling and the agitation of the product started after the 30% filling of the crystallization tank. The above-mentioned cooling procedure of the yogurt serum was applied. At the cooling limit of 30° C., the monohydrate lactose crystals in average size of less than 32 microns were added at a percentage of 0.08% by weight. The distribution of the crystals in the concentrate was uniform, with the absence of lump formation. The yogurt serum was cooled until the temperature limit of 15° C. The cooling time from the temperature of 30° C. to 15° C. was 10 hours. The product then was pre-heated to 18° C. and was fed to the spray dryer. The degree of crystallization was 75% and the size of product crystals was less than 10 microns. The viscosity of the product did not cause any problems neither in the feeding of the dryer nor in the drying stage. High pressure nozzles of type TCSC 43 were used for the drying of the yogurt serum on a two stage spray dryer with an external vibrating fluid bed. The concentrate was sprayed at a pressure of 230 bar and at capacity of 1400 kg/hour. The temperature of the main inlet air was 160° C., while the outlet air temperature was maintained at 86° C. For the integrated fluid bed the temperature was 65° C. and for the first and the second stage of the external fluid bed the temperature was 45° C. and 20° C. respectively.

Silicon dioxide (E551) was added as free flowing agent at a percentage of 0.9% by weight of final product, at the outlet of the external vibrating fluid bed.

Example 2

The same method as described in EXAMPLE 1 was used for processing the Greek style strained yogurt serum. The yogurt serum of 5.3% by weight total solids was initially concentrated to 15.4% by weight. It was afterwards concentrated to a percentage of 47% by weight. The concentrated yogurt serum exiting the flash cooler of the evaporator had a temperature of 45° C. The monohydrate lactose crystals in average size of less than 45 microns were added at the temperature of 30° C. The crystallized serum had 71% degree of crystallization and the product's average crystal size was less than 10 microns. For the spray drying of the product, the high pressure nozzles were of type TCSC 39. The feed inlet to the dryer was 1300 kg/h and the temperature of the main inlet air was maintained at 155° C. Silicon dioxide (E551) was added as free flowing agent at a percentage of 0.8% by weight of final product, at the outlet of the external vibrating fluid bed.

After the aforementioned processing method, the produced Greek style strained yogurt serum powder had the following typical composition:

TABLE 1

| | |
|---|---|
| pH | 4.5 |
| Titratable acidity | 0.45% |
| Lactose | 72.0% |
| Ash | 11.0% |
| Lactic acid | 6.0% |
| Protein | 5.0% |
| Fat | 0.0% |
| Moisture | 4.0% |

However, as discussed in the background section, past attempts to process the serum derived from the Greek style yogurt into a powder form have only resulted in the production of hygroscopic powder with high degree of caking and tendency to form lumps during storage. Additionally, the powder was discolored and was characterized by salty flavor with the absence of a typical yogurt flavor. This was because often a lactic acid neutralizing agent such as calcium dioxide or sodium dioxide was added to neutralize the lactic acid in the serum in an attempt to improve the drying process.

By contrast, the serum powder product according to the present invention has a uniform yellowish color, is non-hygroscopic (i.e., hygroscopicity of at most 10%) without the tendency to form lumps during storage and retains the typical flavor of the Greek style strained yogurt because no acid neutralizing agent is added to neutralize the lactic acid. In particular, the serum powder produced according to the present invention has the following characteristics: acidity of at least 0.35% (preferably 0.40% to 0.50%), lactic acid of at least 4.5% by weight (preferably at least 6% and most preferably 6% to 7%), ash content of between 10% and 14% by weight, hygroscopicity of at most 15% (more preferably non-hygroscopic, which is at most 10%), and protein of at most 5.5% by weight.

The above disclosure is intended to be illustrative and not exhaustive. This description will suggest many modifications, variations, and alternatives may be made by ordinary skill in this art without departing from the scope of the invention. Those familiar with the art may recognize other equivalents to the specific embodiments described herein. Accordingly, the scope of the invention is not limited to the foregoing specification.

What is claimed is:

1. A method of making a powder of serum extracted from a Greek style yogurt comprising:
   increasing the total solids concentration of the serum to at least 35% by weight to produce a concentrated serum;
   crystallizing the concentrated serum by:
      adding monohydrate lactose crystals having an average size of less than 80 microns;
      lowering the temperature of the concentrated serum to between 10° C. and 16° C. at a rate of no greater than 2.5° C./hr over at least 5 hours from the time the lactose crystals are added such that an average size of the lactose crystals in the crystallized serum is less than 15 microns and the degree of crystallization is at least 70%; and
   preheating the crystallized serum to a temperature between 14° C. and 20° C. to improve its rheological properties;
   spray drying the crystallized serum to produce a free-flowing, non-hygroscopic serum powder with an acidity level of at least 0.35% without using any acid neutralizing agent so as to maintain the acidity level of the serum.

2. The method of claim 1, wherein increasing the total solids concentration includes:
   performing reverse osmosis on the serum until the total solids concentration increases to at least 15% by weight;
   further increasing the solids concentration of the serum to at least 35% by weight while the serum is exposed to a temperature of between 40° C. and 70° C. to produce a concentrated serum.

3. The method of claim 1, after the step of increasing the total solids concentration and prior to the step of crystallizing the concentrated serum, further including filling a crystallization container with the concentrated serum while maintaining the temperature of the concentrated serum at between 35° C. and 45° C.

4. The method of claim 1, prior to the step of crystallizing the concentrated serum, further including cooling the concentrated serum to a temperature of between 28° C. and 32° C.

5. The method of claim 1, wherein the step of crystallizing includes waiting until the temperature of the concentrated serum falls below 32° C. before adding the lactose crystals.

6. The method of claim 1, wherein the step of spray drying includes passing the crystallized serum through a nozzle at the pressure of at least 170 bar.

7. The method of claim 1, after the step of spray drying, further including exposing the spray dried serum on a vibrating fluid bed to a hot air stream having a temperature of between 40° C. and 50° C.

8. A powder of serum extracted from a Greek style yogurt comprising:
   a protein content of at most 5.5% by weight;
   a moisture content of at most 5.5% by weight; and lactic acid of at least 4.5% by weight, wherein the powder has an acidity level of at least 0.35% and has a hygroscopicity of at most 10%, wherein the powder is made by the following steps:

increasing the total solids concentration of the serum to at least 35% by weight to produce a concentrated serum;

crystallizing the concentrated serum by:

adding monohydrate lactose crystals having an average size of less than 80 microns;

lowering the temperature of the concentrated serum to between 10° C. and 16° C. at a rate of no greater than 2.5° C./hr over at least 5 hours from the time the lactose crystals are added such that an average size of the lactose crystals in the crystallized serum is less than 15 microns and the degree of crystallization is at least 70%; and preheating the crystallized serum to a temperature between 14° C. and 20° C. to improve its rheological properties;

spray drying the crystallized serum to produce a free-flowing, non-hygroscopic serum powder with an acidity level of at least 0.35% without using any acid neutralizing agent so as to maintain the acidity level of the serum.

9. The powder of claim 8, further comprising an ash content of between 10% and 14% by weight.

10. The powder of claim 8, wherein:

the lactic acid is between 6% and 7% by weight.

11. The method of claim 1, wherein the step of crystallizing includes waiting until the temperature of the concentrated serum falls below 32° C. before adding the lactose crystals.

12. The method of claim 1, after the step of spray drying, further including:

exposing the spray dried serum on a vibrating fluid bed to a hot air stream having a temperature of between 40° C. and 50° C.; and after the serum has been exposed to the hot air stream, exposing the serum to a cooling air stream having a temperature of between 15° C.-20° C.

13. A method of making a powder of serum extracted from a Greek style yogurt comprising:

increasing the total solids concentration of the serum to at least 35% by weight to produce a concentrated serum;

crystallizing the concentrated serum by:

adding monohydrate lactose crystals having an average size of less than 80 microns;

lowering the temperature of the concentrated serum to between 10° C. and 16° C. at a rate of no greater than 2.5° C./hr over at least 5 hours from the time the lactose crystals are added such that an average size of the lactose crystals in the crystallized serum is less than 15 microns and the degree of crystallization is at least 70%;

preheating the crystallized serum to a temperature between 14° C. and 20° C. to improve its rheological properties;

spray drying the crystallized serum by passing the crystallized serum through nozzles each having an orifice of between 0.99 mm and 1.09 mm and at the pressure of at least 170 bar to produce a free-flowing, non-hygroscopic serum powder with an acidity level of at least 0.35% without using any acid neutralizing agent so as to maintain the acidity level of the serum.

14. The method of claim 13, wherein increasing the total solids concentration includes:

performing reverse osmosis on the serum until the total solids concentration increases to at least 15% by weight;

further increasing the solids concentration of the serum to at least 35% by weight while the serum is exposed to a temperature of between 40° C. and 70° C. to produce a concentrated serum.

15. The method of claim 13, after the step of increasing the total solids concentration and prior to the step of crystallizing the concentrated serum, further including filling a crystallization container with the concentrated serum while maintaining the temperature of the concentrated serum at between 35° C. and 45° C.

16. The method of claim 13, wherein the step of crystallizing includes waiting until the temperature of the concentrated serum falls below 32° C. before adding the lactose crystals.

17. The method of claim 13, after the step of spray drying, further including:

exposing the spray dried serum on a vibrating fluid bed to a hot air stream having a temperature of between 40° C. and 50° C.; and after the serum has been exposed to the hot air stream, exposing the serum to a cooling air stream having a temperature of between 15° C.-20° C.

* * * * *